United States Patent
Bataller et al.

(10) Patent No.: US 9,773,157 B2
(45) Date of Patent: *Sep. 26, 2017

(54) SYSTEM AND METHOD FOR FACE CAPTURE AND MATCHING

(71) Applicant: ACCENTURE GLOBAL SERVICES LIMITED, Dublin (IE)

(72) Inventors: Cyrille Bataller, Mougins (FR); Anders Astrom, Antibes (FR)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 14/961,294

(22) Filed: Dec. 7, 2015

(65) Prior Publication Data

US 2016/0104033 A1    Apr. 14, 2016

Related U.S. Application Data

(63) Continuation of application No. 13/753,847, filed on Jan. 30, 2013, now Pat. No. 9,230,157.

(Continued)

(51) Int. Cl.
*G06K 9/00* (2006.01)
*G06K 9/62* (2006.01)
(Continued)

(52) U.S. Cl.
CPC ..... *G06K 9/00255* (2013.01); *G06K 9/00288* (2013.01); *G06K 9/00295* (2013.01);
(Continued)

(58) Field of Classification Search
None
See application file for complete search history.

(56) References Cited

U.S. PATENT DOCUMENTS 5,386,103 A    1/1995  DeBan et al.
6,111,517 A    8/2000  Atick et al.
(Continued)

FOREIGN PATENT DOCUMENTS

EP    0786735 A2    7/1997
EP    1600882 A1    11/2005

OTHER PUBLICATIONS

Brian C. Lovell et al.: "Invited Paper: Embedded Face and Biometric Technologies for National and Border Security", Computer Vision and Pattern Recognition Workshops (CVPRW), 2011 IEEE Computer Society Conference on, IEEE, Jun. 20, 2011 (Jun. 20, 2011), pp. 117-122, XP031926583.

(Continued)

*Primary Examiner* — Delomia L Gilliard
(74) *Attorney, Agent, or Firm* — Mannava & Kang, P.C.

(57) ABSTRACT

According to an example, a face capture and matching system may include a memory storing machine readable instructions to receive captured images of an area monitored by an image capture device, and detect one or more faces in the captured images. The memory may further store machine readable instructions to track movement of the one or more detected faces in the area monitored by the image capture device, and based on the one or more tracked detected faces, select one or more images from the captured images to be used for identifying the one or more tracked detected faces. The memory may further store machine readable instructions to select one or more fusion techniques to identify the one or more tracked detected faces using the one or more selected images. The face capture and matching system may further include a processor to implement the machine readable instructions.

20 Claims, 14 Drawing Sheets

Related U.S. Application Data

(60) Provisional application No. 61/592,305, filed on Jan. 30, 2012.

(51) Int. Cl.

| | | |
|---|---|---|
| *G06T 11/80* | (2006.01) | |
| *G06T 17/00* | (2006.01) | |
| *G06T 7/246* | (2017.01) | |

(52) U.S. Cl.
CPC ....... *G06K 9/00771* (2013.01); *G06K 9/6201* (2013.01); *G06K 9/6255* (2013.01); *G06T 7/246* (2017.01); *G06T 11/80* (2013.01); *G06T 17/00* (2013.01)

(56) References Cited

U.S. PATENT DOCUMENTS

| | | | |
|---|---|---|---|
| 6,496,595 | B1 | 12/2002 | Puchek et al. |
| 8,948,465 | B2 | 2/2015 | Tiwari et al. |
| 9,020,207 | B2 | 4/2015 | Paul et al. |
| 9,195,893 | B2 | 11/2015 | Tiwari et al. |
| 9,262,675 | B2 | 2/2016 | Wabgaonkar et al. |
| 9,292,749 | B2 | 3/2016 | Tiwari et al. |
| 9,390,338 | B2 | 7/2016 | Tiwari et al. |
| 2003/0184468 | A1 | 10/2003 | Chen et al. |
| 2004/0240711 | A1* | 12/2004 | Hamza ............... G06K 9/00201 382/118 |
| 2005/0063566 | A1 | 3/2005 | Beek et al. |
| 2005/0265603 | A1* | 12/2005 | Porter ............... G06K 9/00248 382/190 |
| 2006/0104484 | A1 | 5/2006 | Bolle et al. |
| 2006/0104487 | A1 | 5/2006 | Porter et al. |
| 2007/0047775 | A1* | 3/2007 | Okubo ............... G06K 9/00248 382/118 |
| 2007/0269082 | A1* | 11/2007 | Matsuyama ....... G06K 9/00241 382/118 |
| 2010/0157040 | A1 | 6/2010 | Ofir |
| 2010/0157128 | A1* | 6/2010 | Choi ................. H04N 5/23248 348/333.03 |
| 2010/0329568 | A1 | 12/2010 | Gamliel et al. |
| 2011/0074950 | A1* | 3/2011 | Oka ....................... A61B 1/042 348/137 |
| 2011/0106734 | A1 | 5/2011 | Boult et al. |
| 2011/0228094 | A1 | 9/2011 | Cheng et al. |
| 2012/0314911 | A1 | 12/2012 | Paul et al. |
| 2013/0195316 | A1 | 8/2013 | Bataller et al. |
| 2013/0266193 | A1 | 10/2013 | Tiwari |
| 2015/0161460 | A1 | 6/2015 | Tiwari et al. |
| 2015/0178569 | A1 | 6/2015 | Tiwari et al. |
| 2016/0155007 | A1* | 6/2016 | Tiwari ............... G06K 9/00771 382/115 |

OTHER PUBLICATIONS

Brian C. Lovell et al.: "Parallel Distributed Face Search System for National and Border Security", The 7th U.S./Australia Joint Workshop on Defense Applications of Signal Processing (DASP), Jul. 10, 2011 (Jul. 10, 2011), pp. 117-123, XP055074042.

Knuth, The Art of Computer Programming, vol. 3, Section 6.2.1 :Searching an Ordered Table, Second Edition, Third Printing. Addison-Wesley, Aug. 1998 ISBN 0-201-89685-0, 20 pages.

Monro, et al., "DCT-based Iris Recognition" published in IEEE Transactions on Pattern Analysis and Machine Intelligence, vol. 29, No. 4, Apr. 2007, 10 pages.

Qi Han et al: "A Non-uniform Quantizing Approach to Protect Biometric Templates", Intelligent Information Hiding and Multimedia Signal Processing, 2006. IIH-MSP '06. International Conference on, IEEE, PI, Dec. 1, 2006 (Dec. 1, 2006), pp. 693-698, XP031034150.

Stan Z. Li et al: "Biometrics at a Distance: Issues, Challenges, and Prospects", Jan. 1, 2009 (Jan. 1, 2009), Handbook of Remote Biometrics: Advances in Pattern Recognition; [Advances in Pattern Recognition], Springer, UK, pp. 3-21, XP008163781.

Tsalakanidou et al., "A 3D face and hand biometric system for robust user-friendly authentication", Pattern Recognition Letters, Elsevier, Amsterdam, NL, vol. 28, No. 16, Oct. 11, 2007 (Oct. 11, 2007), pp. 2238-2249, XP022293676.

Turk, et al "Eigenfaces for Recognition", Journal of Cognitive Neuroscience, vol. 3, No. 1, Jan. 1, 1991, pp. 71-86.

European Search Report for Application No. 13162720.0-1901 dated Aug. 13, 2013,3 pages.

Pinto, Examiner in corresponding European Application No. EP12004276.7, "European Search Report", Dec. 4, 2012, 5 pages.

European Office Action in Application No. 13162720.2-1901 dated Apr. 23, 2014, 9 pages.

U.S. Non-Final Office Action for U.S. Appl. No. 13/409,584 dated Aug. 29, 2014, 21 pages.

U.S. Notice of Allowance for U.S. Appl. No. 13/598,819 dated Sep. 26, 2014,24 pages.

U.S. Notice of Allowance for U.S. Appl. No. 13/409,584 dated Nov. 12, 2014, 12 pages.

Cheng-Hsiung Hsieh et al., "Image Enhancement and Image Hiding Based on Linear Image Fusion—Image Fusion," Osamu Ukimura (Ed.), ISBN: 978-953-307-679-9, InTech, Available from: http://www.intechopen.com/books/image-fusion/image-enhancement-and-image-hiding-based-on-linearimage-fusion, Jan. 12, 2011, pp. 23-42.

"The extended European search report" for European Patent Application No. 13000443.5 dated Jul. 31, 2014, European Patent Office, 6 pages.

* cited by examiner

SYSTEM AND METHOD FOR FACE CAPTURE AND MATCHING

PRIORITY

This application is a Continuation of commonly assigned and co-pending U.S. patent application Ser. No. 13/753,847, filed Jan. 30, 2013, which claims priority to Provisional Application Ser. No. 61/592,305, filed Jan. 30, 2012, entitled "SYSTEM AND METHOD FOR FACE CAPTURE AND MATCHING", the disclosures of which are hereby incorporated by reference in their entireties.

BACKGROUND

Biometric identification can be used in facilities, such as, for example, an airport, to screen passengers. Passengers may be screened by standing in front of a camera that captures their image, and the image may be compared to pre-existing images to determine a match. In a crowd, facial identification can be an intensive task as recognizing people of interest may require manual identification of a person. For example, a screener may memorize the faces of a few people and attempt to recognize such people in a crowd. Such identification can be unreliable and manually intensive. Such identification techniques can also limit the potential applications of facial recognition, for example, due to the number of people that may be successfully identified.

BRIEF DESCRIPTION OF DRAWINGS

The embodiments are described with reference to the following figures.

DETAILED DESCRIPTION OF EMBODIMENTS

Figure 1:
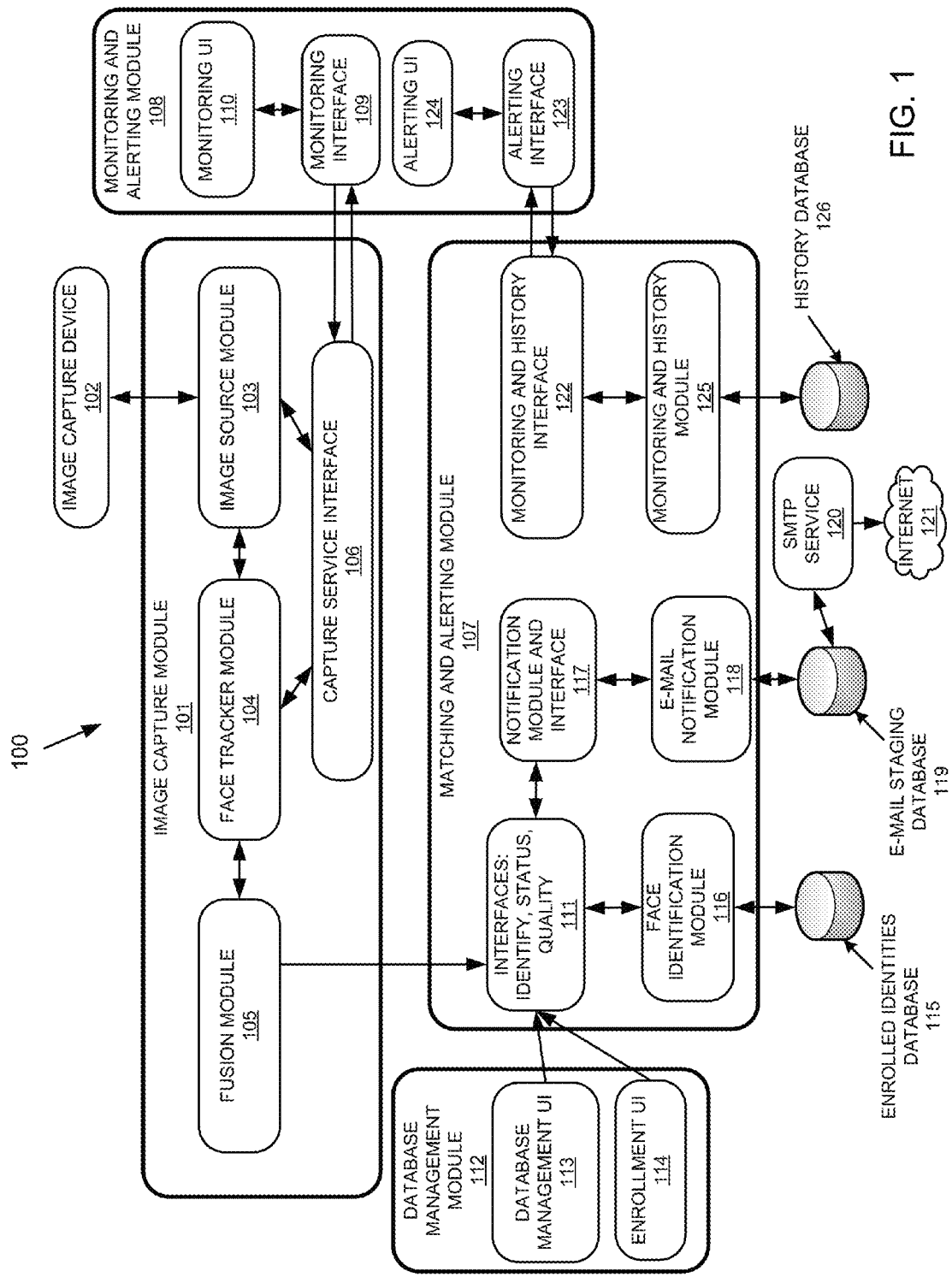
FIG. 1 illustrates an architecture of a face capture and matching system, according to an example of the present disclosure.

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

According to an example, a face capture and matching system may include a memory storing machine readable instructions to receive captured images of an area monitored by an image capture device, and detect one or more faces in the captured images. The memory may further store machine readable instructions to track movement of the one or more detected faces in the area monitored by the image capture device, and based on the one or more tracked detected faces, select one or more images from the captured images to be used for identifying the one or more tracked detected faces. The memory may further store machine readable instructions to select one or more fusion techniques to identify the one or more tracked detected faces using the one or more selected images. The face capture and matching system may further include a processor to implement the machine readable instructions.

Generally, the face capture and matching system may include a face in the crowd (FitC) software solution, and networked personal computers (PCs). The system may further include an image capture device including, for example, a primary face capture camera which may also be networked, and a standalone face capture camera system for recognizing people, as well as for facilitating authentication against a claimed identity. As described in detail below, critical success factors (CSFs) may be defined prior to the implementation of the system at a site. The face capture and matching system may be applied to any scenario where identification of people is desired. For example, the system may be used for passenger timing, face watchlisting, unknown passenger identification, and border pre-clearance. Other examples of applications of the system may include identification of high-value customers in a retail environment, or to personalize dynamic advertisements displayed within an airport.

The system and method disclosed herein provide the ability to connect to any source of images (e.g., cameras, recording systems, video management systems, etc.). The system and method disclosed herein provide for the queuing of frames with a high number of faces for processing at a later time when a lower number of faces are present in an area being monitored. The system and method disclosed herein provide for feedback to a camera used therewith, for example, to improve image quality in areas of interest (i.e., improve image quality where faces are, as opposed to improvement of overall image quality or improvement based on preset locations), or to instruct the camera to zoom to a specific area of interest where faces are present. The system and method disclosed herein provide a combination of tracking and fusion to reduce the number of faces that are used for face matching. The system and method disclosed herein further provide for the dynamic selection of fusion techniques (e.g., single best face image fusion technique, matching template fusion technique, and/or 3D model fusion technique) based, for example, on face qualities and/or availability of system resources.

The system and method described herein provide a technical solution to the technical problem of face detection and identification by matching detected faces to a predetermined list of captured faces. In many instances, manual face detection and matching is not a viable solution given the heterogeneity and complexity of manually identifying people of interest, which can lead to inconsistent results. The system and method described herein provide the technical solution of automatically detecting one or more faces in captured images of an area monitored by an image capture device. The system and method also provide the technical solution of automatically tracking movement of the one or more detected faces in the area monitored by the image capture device, and based on the one or more tracked detected faces, automatically selecting one or more images from the captured images to be used for identifying the one or more tracked detected faces. The system and method further provide the technical solution of automatically selecting one or more fusion techniques to identify the one or more tracked detected faces using the one or more selected images. The fusion techniques may include, for example, a single best face image fusion technique based on detection of a frontal face of a predetermined quality to identify the one or more tracked detected faces, a matching template fusion technique based on a combination of a plurality of frontal faces to generate a fused matching template to identify the one or more tracked detected faces, and a three-dimensional (3D) model fusion technique based on generation of a 3D model of a face from a plurality of detected faces to identify the one or more tracked detected faces.

Referring to FIG. 1, a face capture and matching system 100 is shown and may include an image capture module 101 to provide automated or supervised detection, tracking and extraction of faces from an image capture device 102. The image capture device 102 may include a camera, such as, for example, a wide-angle camera, a longer focal length camera, or other such devices to capture images. An image source module 103 may receive data from the image capture device 102 and extract data for use by a face tracker module 104, a fusion module 105, and a capture service interface 106. For example, the image source module 103 may receive captured images of an area monitored by the image capture device 102, and detect one or more faces in the captured images. The face tracker module 104 may track faces in images or other types of data captured by the image capture device 102. For example, the face tracker module 104 may track movement of the one or more detected faces in the area monitored by the image capture device 102. The fusion module 105 may determine a combination of one or more fusion techniques to be used to identify and match faces using a matching and alerting module 107. For example, the face tracker module 104 and the fusion module 105 may select one or more images from the captured images to be used for identifying the one or more tracked detected faces. Further, the fusion module 105 may select one or more fusion techniques to identify the one or more tracked detected faces using the one or more selected images. The capture service interface 106 may communicate with a monitoring and alerting module 108 to send and receive monitoring data, such as, for example, image capture data, using a monitoring interface 109. The monitoring and alerting module 108 may further include a monitoring user interface (UI) 110 to display and receive relevant monitoring information from a user of the system 100, such as, for example, registration information for the monitoring UI 110.

With continued reference to FIG. 1, the matching and alerting module 107 may include interfaces 111 to receive data from the fusion module 105 related to the combination of one or more fusion techniques to be used to analyze and match faces using the matching and alerting module 107. The interfaces 111 may further send and receive data from a database management module 112 that includes a database management UI 113 and an enrollment UI 114. The enrollment UI 114 may receive and send, for example, enrollment data related to faces being identified. The database management UI 113 and the enrollment UI 114 may be used to manage identities of known individuals stored in the enrolled identities database 115.

With continued reference to FIG. 1, a face identification module 116 may identify faces using the enrolled identities database 115. For example, the face identification module 116 may identify the one or more tracked detected faces using the one or more selected images, and may further match the identified face to a predetermined list of captured faces in the enrolled identities database 115. The enrolled identities database 115 may include faces that are placed, for example, on a watchlist. The interfaces 111 may further send and receive data related to status and quality of faces being identified by the face identification module 116. The matching and alerting module 107 may further include a notification module and interface 117 to send and receive notifications of aspects related to identification, status, and quality of identifications. The notification module and interface 117 may forward notifications via an e-mail notification module 118 that communicates with an e-mail staging database 119. The e-mail staging database 119 may include predetermined e-mail templates for alerting a user of the system 100, and further store e-mails sent by the e-mail notification module 118. The e-mail staging database 119 may further communicate with a simple mail transfer protocol (SMTP) service 120 for communications over the Internet 121. The matching and alerting module 107 may further include a monitoring and history interface 122 to send and receive alert data, including, for example, face identification information, and transaction date and ID information, using an alerting interface 123. The monitoring and alerting module 108 may further include an alerting UI 124 to receive and display relevant alerting information to a user of the system 100. For example, the alerting UI 124 may generate a color coded signal and/or an audio signal to alert a user of the face capture and matching system 100 of the matched face. The monitoring and history interface 122 may include a monitoring and history module 125 that communicates with a history database 126. For example, the monitoring and history module 125 may store and retrieve a history of alerts for identified faces from the history database 126. The functions performed by each of the modules and other components of the system 100 may be individually modified as needed.

The modules and other components of the system 100 that perform various other functions in the system 100, may comprise machine readable instructions stored on a non-transitory computer readable medium. In addition, or alternatively, the modules and other components of the system 100 may comprise hardware or a combination of machine readable instructions and hardware.

Figure 2:
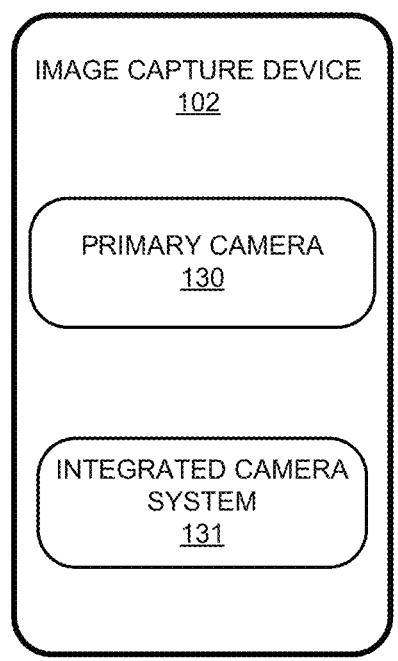
FIG. 2 illustrates an image capture device used with the face capture and matching system, according to an example of the present disclosure.

Referring to FIGS. 1 and 2, the image capture device 102 may include a camera, video management system, video recordings, or any other video source that is supported by the image source module 103. For example, the image capture device 102 may include a primary camera 130 with fixed-focus. For example, the primary camera 130 may be a static camera with lenses optimized for face capture at a distance. As described below, for example, with reference to FIG. 4, the primary camera 130 may be positioned to capture faces, and the faces may be matched against the enrolled identities database 115 by the face identification module 116. Alternatively, as described below, for example, with reference to FIGS. 6 and 7, a first primary camera 130 may be positioned at a first location to capture faces, with the faces being saved in a database (e.g., the enrolled identities database 115), and a second primary camera 130 may be positioned at a second location to capture faces, with the faces captured at the second location being matched against the saved faces. An integrated camera system 131 including two separate cameras, with one wide-angle camera (e.g., the primary camera 130 operated in a wide-angle mode) and one camera with a longer focal length and narrower field-of-view may also be included in the image capture device 102. The wide-angle camera may survey the capture area (i.e., an area monitored by the image capture device 102), and when a face is identified, the system 100 may direct the field-of-view of the second camera by means of a movable mirror. In this way, many faces may be captured at high-resolution in a short period of time.

The image source module 103 may perform the functions of image acquisition, face detection, image assessment, image enhancement, and face extraction. With regard to image acquisition, the image source module 103 may acquire images from the image capture device 102. The image source module 103 may operate independently of the image capture device 102, and thus independently of the source of captured images. The image source module 103 may queue the acquired images to reduce the processing resources needed for processing the acquired images. For example, the image source module 103 may queue the acquired images such that images that contain many faces are processed without having to drop any, or in some cases too many consecutive images. For example, the image source module 103 may queue the acquired images so that images that include faces, as detected by the image source module 103, are placed in a queue for processing, and images that do not contain faces are excluded from the queue. Thus, generally, the image source module 103 may queue the captured images to process the captured images that include a predetermined number of detected faces for movement tracking by the face tracker module 104. Further, images placed in the queue for processing may also be selected based on quality metrics, such as, for example, sharpness of the detected faces. In this manner, processing of images by the image source module 103 may include a predetermined time lag based, for example, on a number of detected faces, and a quality of the detected faces. In this manner, processing resources of the image source module 103 and the face tracker module 104 may be used to process images that include detected faces, and/or images of a predetermined quality of the detected faces, as opposed to all images that are captured by the image capture device 102. The predetermined time lag may also be used by the image source module 103 to add or remove images from the queue for movement tracking by the face tracker module 104. For example, images may be removed from a queue if they are determined to be of a lower quality compared to subsequently captured images of the same person (e.g., based on a determination by the face tracker module 104). If images include several faces, quality of the detected faces may be compared to drop one or more consecutive images. Images may be added to a queue once they are determined to be of a sufficient quality, or the images are determined to be of different people based on a determination by the face tracker module 104. The foregoing aspects provide benefits, such as, for example, capture of more faces by the image source module 103. For example, the use of a queue may provide for allocation of system resources that are not sufficient to process all faces present in real-time when many faces are present. Thus, the use of a queue may provide for a reduction in peak usage of system resources if processing of faces is not mandated to be in real time, thus introducing a lag in the processing of faces. The size and/or retention time of faces in the queue may be configurable such that in the event real-time processing is preferred over processing of all faces, the system may operate in a real-time mode that includes a lag including a predetermined maximum duration.

With regard to face detection, the image source module 103 may detect faces in an image stream of the image capture device 102. For example, the image source module 103 may crop each image of a captured video stream with an area of focus, such as, for example, a rectangle over a particular face. For example, if n faces are detected in a raw image, the image source module 103 may crop each of the n faces, resulting in n smaller images, each containing a face.

Based on the detected faces, with regard to image assessment, the image source module 103 may extract data for each detected face. Based on the available resources, the image source module 103 may extract as much data as possible, or necessary, about each detected face. Data that can be extracted may include, for example, various image quality metrics, as well as assessments of age and gender. Examples of image quality metrics may include luminosity, sharpness, etc.

With regard to image enhancement, the video stream from the image capture device 102 may also be enhanced, for example, for contrast, noise reduction, etc. The video stream from the image capture device 102 may also be enhanced for feedback to the image capture device 102, for example, for modification of shutter, zoom, pan, tilt, and/or zoom settings. Thus, the enhancements may be provided for images themselves (e.g., enhancements related to contrast, noise reduction, etc.) and the image capture device 102 (e.g., enhancements related to the shutter, zoom, pan, tilt, and/or zoom settings). The feedback to the image capture device 102 may be automated, for example, for enhancing particular zones of an image (e.g., where there are faces), as opposed to enhancing an overall image. The feedback to the image capture device 102 may be used to improve further images that are captured.

With regard to face extraction, the image source module 103 may extract the detected faces from the background of an image. The image source module 103 may operate in conjunction with the face tracker module 104 and the fusion module 105 to extract the detected faces from the background of an image.

The face tracker module 104 may track each face as it moves across the field of view (i.e., the area monitored) of the image capture device 102, and thus between different images. The tracked faces may be assigned a tracking identification (ID) as they move across images. A tracked face may be determined to be the face of the same person without additional biometric matching if the face is located within a close proximity in different images. For example, if a tracked face is located within a predetermined distance in different images, the tracked face may be determined to be the face of the same person without additional biometric matching. For example, if a tracked face is located at a position x1,y1 in a first image, and at a position x2,y2 in a second consecutive image, where the distance between the positions x1,y1 and x2,y2 is within a predetermined range, the tracked face may be determined to be the face of the same person without additional biometric matching. The determination of whether a tracked face is a face of the same person may also account for a direction of movement of the tracked face. For example, if a tracked face is determined to be moving generally along the same direction of movement between different images, the tracked face may be determined to be the face of the same person without additional biometric matching. The determination of whether a tracked face is a face of the same person may also account for a size of the tracked face. For example, if a tracked face is determined to be of the same size between different images, the tracked face may be determined to be the face of the same person without additional biometric matching. The determination of whether a tracked face is a face of the same person may also account for an image capture rate of the image capture device 102. For example, if an image capture rate (i.e., frame rate) of the image capture device 102 is high, this image capture rate may be accounted for to decrease the predetermined distance in different images, compared to an image capture rate of the image capture device 102 being lower. The face tracker module 104 may therefore determine a number of coordinates in a field of view of the image capture device 102 where faces are detected in different images, determine data related to a position and size of different faces, determine the movement different faces make between different images, and determine which faces in a given image are likely to be the same faces in consecutive images without additional biometric matching.

The fusion module 105 may group, and in certain cases, merge images of the same faces together. The grouping and/or merging by the fusion module 105 may be based on the face tracking performed by the face tracker module 104 to thus eliminate images containing potentially redundant faces. The fusion module 105 may select the best face(s) for each detected person for matching by the matching and alerting module 107. The fusion module 105 may dynamically select one or more fusion techniques based, for example, on a number of detected faces per tracking ID, quality of faces in an image, and availability of processing resources. Examples of fusion techniques may include, for example, a single best face image fusion technique, a matching template fusion technique, and a three-dimensional (3D) model fusion technique. By choosing one or more of the foregoing fusion techniques, the fusion module 105 may optimize face detection and matching, while at the same time minimizing system resource utilization. For example, one or more of the foregoing fusion techniques may be chosen after a face leaves an area being monitored by the image capture device 102, after a predetermined time period, and/or after a certain amount of data has been acquired for effective use of one or more of the foregoing fusion techniques. In this manner, the face detection and matching may be optimized while concurrently minimizing resource utilization by the system 100. The single best face image fusion technique, the matching template fusion technique, and the 3D model fusion technique may also be used by the fusion module 105 in cases where a person is of high interest to thus confirm a match or negate a potential false match.

For the single best face image fusion technique, the fusion module 105 may select a single best face image per tracking ID. The single best face image fusion technique may generally use less processing and may be relatively fast. The single best face image fusion technique may be generally limited to frontal face images that have good quality. Thus the single best face image fusion technique may be used if a frontal face of a sufficient quality is detected by the image source module 103, to thus minimize resource utilization by the system 100.

The matching template fusion technique may extract one fused matching template from all, or some of the detected images. The matching template fusion technique may generally use relatively fast but additional processing compared to the single best face image fusion technique. The matching template fusion technique may be used primarily for frontal images. For the matching template fusion technique, a plurality of images may be fused together to generate one fused matching template. The images that are selected to be fused together may be selected based, for example, on image quality, face detection quality, and whether the face tracker module 104 determines tracked faces to be of the same person. Based on the fused matching template, the fusion module 105 may select the best face(s) for each detected person for subsequent matching by the matching and alerting module 107.

The 3D model fusion technique may reconstruct a 3D model of a face from all or some of the face images, and then virtually rotate the 3D face model to a frontal image of a face. The 3D model fusion technique may be used if limited frontal face data is obtained by the image source module 103. For example, the 3D model fusion technique may be used if a person walks across the field of view of the image capture device 102, or is otherwise obscured. In such a case, the 3D model fusion technique may reconstruct the 3D model of a face from the limited frontal face data, and other side face data from all or some of the face images. Thus the 3D model fusion technique, which may result in the highest resource utilization by the system 100, may be used if a frontal face of a sufficient quality is not detected by the image source module 103, which may result in inadequate matching using the single best face image fusion technique or the matching template fusion technique.

The face identification module 116 may receive processed images from the fusion module 105 via the interfaces 111. Face images that are of a predetermined quality may be compared against face images stored in the enrolled identities database 115. A list of best matching candidate face images may be determined. A matching score may be assigned to each of the candidate face images. Based, for example, on the matching score and/or quality of the face images that are used by the face identification module 116, the face identification module 116 may determine if any of the returned comparison results are actual matches.

Based on the determination by the face identification module 116 of whether any of the returned comparison results are actual matches, the e-mail notification module 118 may forward, for example, an e-mail to a user of the system 100. The e-mail may include, for example, an indication of whether a face has been identified in an image, identification information related to the face, such as, for example, name, age, gender, etc. Further, the e-mail may include an indication of whether the identified face is for a person in a particular list (e.g., a whitelist or blacklist). Examples of other actions taken by the notification module and interface 117 may include sounding an alarm, opening or closing a gate, automatically enrolling a face in the enrolled identities database 115, etc. Alternatively or additionally, the monitoring and history module 125 may alert a user of the system 100 via the alerting UI 124. For example, the alerting UI 124 may be used to display identification information related to the identified face, such as, for example, name, age, gender, etc., and/or whether the identified face if for a person in a particular list. If information such as the age and gender of the person is not available in the enrolled identities database 115, the face identification module 116 may estimate the person's age and gender based, for example, on the person's facial features. The alerting UI 124 may also be used to display people that are on a particular list (e.g., a whitelist or blacklist) using color coding and/or other audio/visual indications. The alerting UI 124 may also display other metrics, such as, for example, a quality score for a match. The color coding and/or other audio/visual indications may be used in conjunction with the quality score for the match to indicate whether the match is a good match (i.e., acceptable to a user of the system 100 based on user-defined criteria for matches) or a bad match (i.e., unacceptable to the user of the system 100). Further, the alerting UI 124 may be used to open or close a gate or door to enroll an individual in the enrolled identities database 115 via the enrollment UI 114. An operator using the alerting UI 124 may also override any automatic decisions of the monitoring and history module 125 (e.g., opening/closing a gate, etc.), or take other actions. The alerting UI 124 may therefore provide an indication of who is detected, and where and when this person is detected, to thus provide an overview of such detection circumstances related to the detected person. Thus, compared to manual monitoring of a video feed, the monitoring UI 110 may operate in conjunction with the alerting UI 124 and may provide relevant video feeds related to an event and/or a person of interest. The monitoring UI 110 may also provide contextualized and actionable information, such as maps, history, etc.

Figure 3:
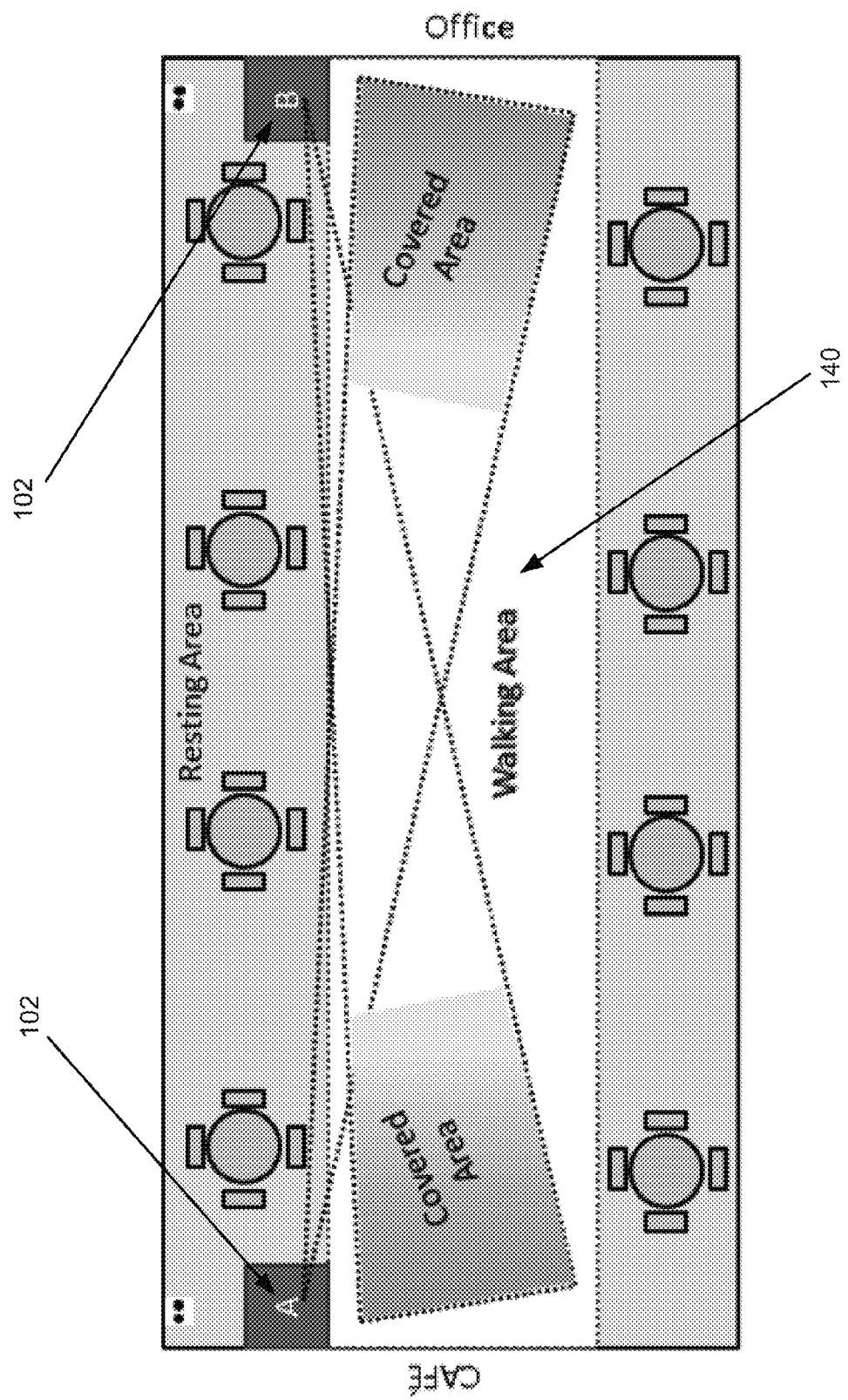
FIG. 3 illustrates a setup of the face capture and matching system, with cameras being set up at either end of a walkway, according to an example of the present disclosure.

Referring to FIG. 3, an example of a set-up of the image capture device 102, including the primary cameras 130 and/or the integrated camera system 131 is shown. The cameras may be set up at either end of a walkway 140, for example, at points "A" and "B". Thus, people passing in either direction would be captured as they passed through the cameras' fields of view.

Figure 4:
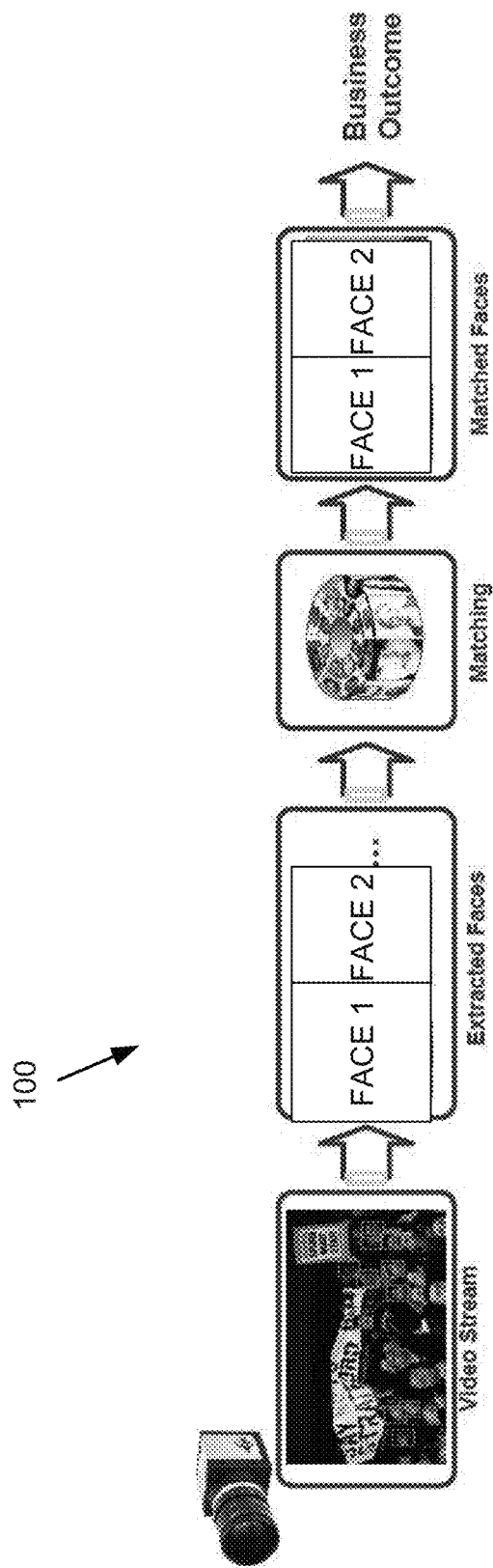
FIG. 4 illustrates a simplified diagram of the face capture and matching system, according to an example of the present disclosure.
Figure 5:
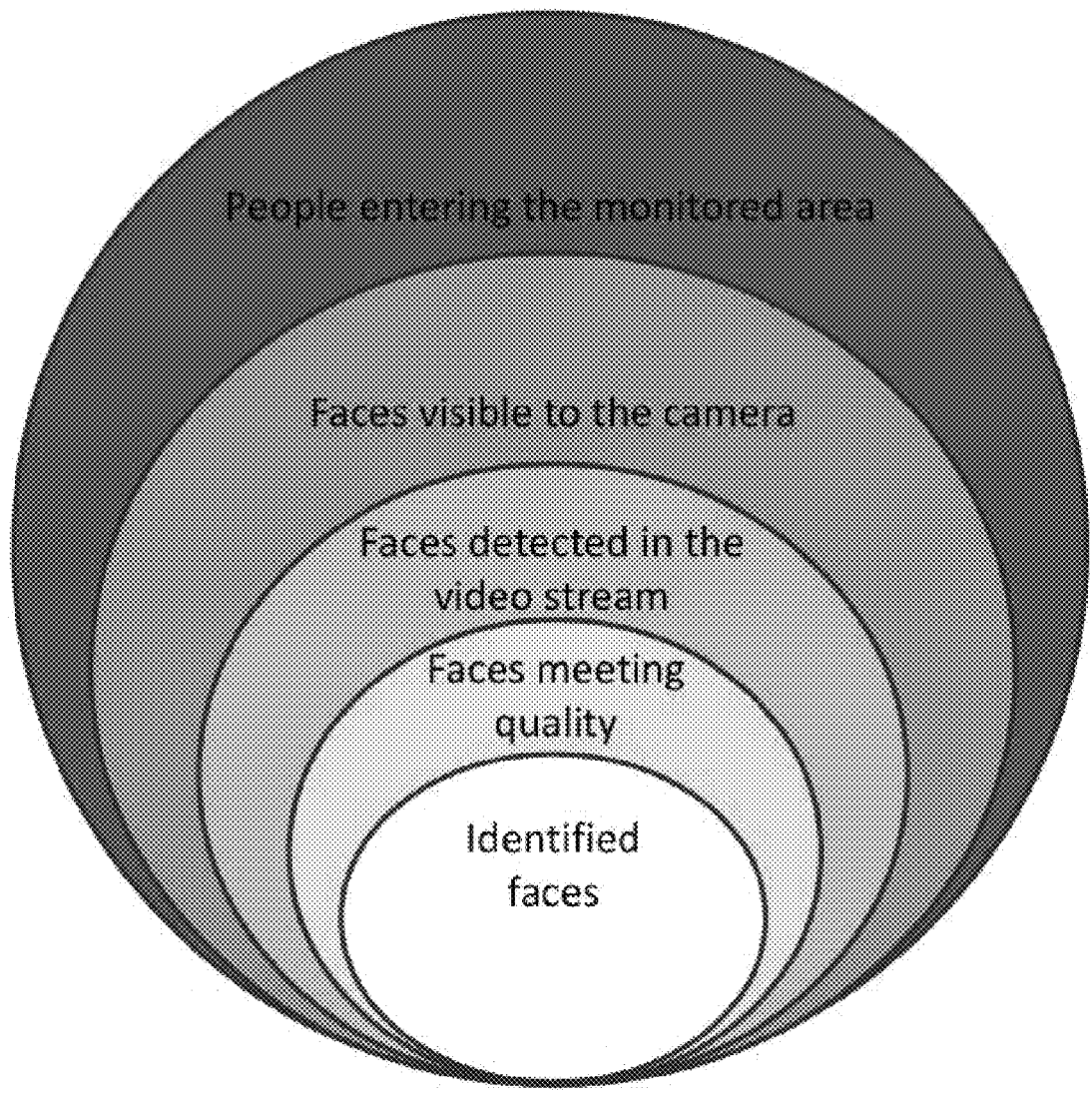
FIG. 5 illustrates capture and identification (i.e., matching) stages, according to an example of the present disclosure.

Referring to FIG. 4, a simplified diagram of the face capture and matching system 100 is illustrated. As shown in FIG. 4, there is a certain complexity to measuring the success of face capture and identification. For example, looking at the simplest case of capturing a face and matching it against a database, such capture and matching may include a failure rate, which can be minimized. For example, of the total number of people passing the monitored area, only a certain proportion may be visible to the image capture device 102. For example, some people may be turned away, or perhaps walking behind other people. Of these visible people, a subset of their faces may be detected by the image source module 103 and extracted from the video stream. Of these extracted faces, only a subset may be of sufficient biometric quality to be useful. These usable faces may then be biometrically matched against the enrolled identities database 115 by the face identification module 116, and a proportion may be correctly identified, depending on factors such as, for example, the properties of the matching algorithm for the face identification module 116, the size of the enrolled identities database 115, etc. Thus, referring to FIG. 5, the proportion of people successfully identified may be a function of several variables. For example, the proportion of people successfully identified may be based on people entering the monitored area, faces visible to the image capture device 102, identified faces, faces detected in the video stream, and faces meeting quality standards. These different steps in the identification process may require use of a number of different success factors to accurately describe the performance of the system 100. For example, at the lowest level, the capture rate may be ascertained based on the proportion of people that walk through the monitored area of the image capture device 102 and for whom faces are detected by the system 100. The capture rate may include as factors the first four tiers of FIG. 5 (i.e., people entering the monitored area, faces visible to the image capture device 102, faces detected in the video stream, and faces meeting quality standards). For FIG. 5, the capture rate may include the people that could not reasonably be expected to be captured. The capture rate may also exclude faces that were captured but are not of sufficient quality. To be counted as successfully-captured, a face may be detected, extracted, and of sufficient quality to be useful.

At a higher-level, a true match rate (TMR) and a false match rate (FMR) may be used to refer to those faces who have already been captured by the image capture device 102, and are then matched successfully (or not) against the enrolled identities database 115. Considering only the identification step, this is the top tier in FIG. 5. Overall, a true identification rate (TIR) and a false identification rate (FIR) may be considered based on those people who walk through the monitoring zone of the image capture device 102 and are successfully matched against the enrolled identities database 115 (i.e., all tiers of FIG. 5). Which metrics are the most meaningful depends on the individual business scenario under analysis.

Examples of application of the system 100 for passenger timing, face watchlisting, unknown passenger identification, and border pre-clearance are now discussed.

Figure 6:
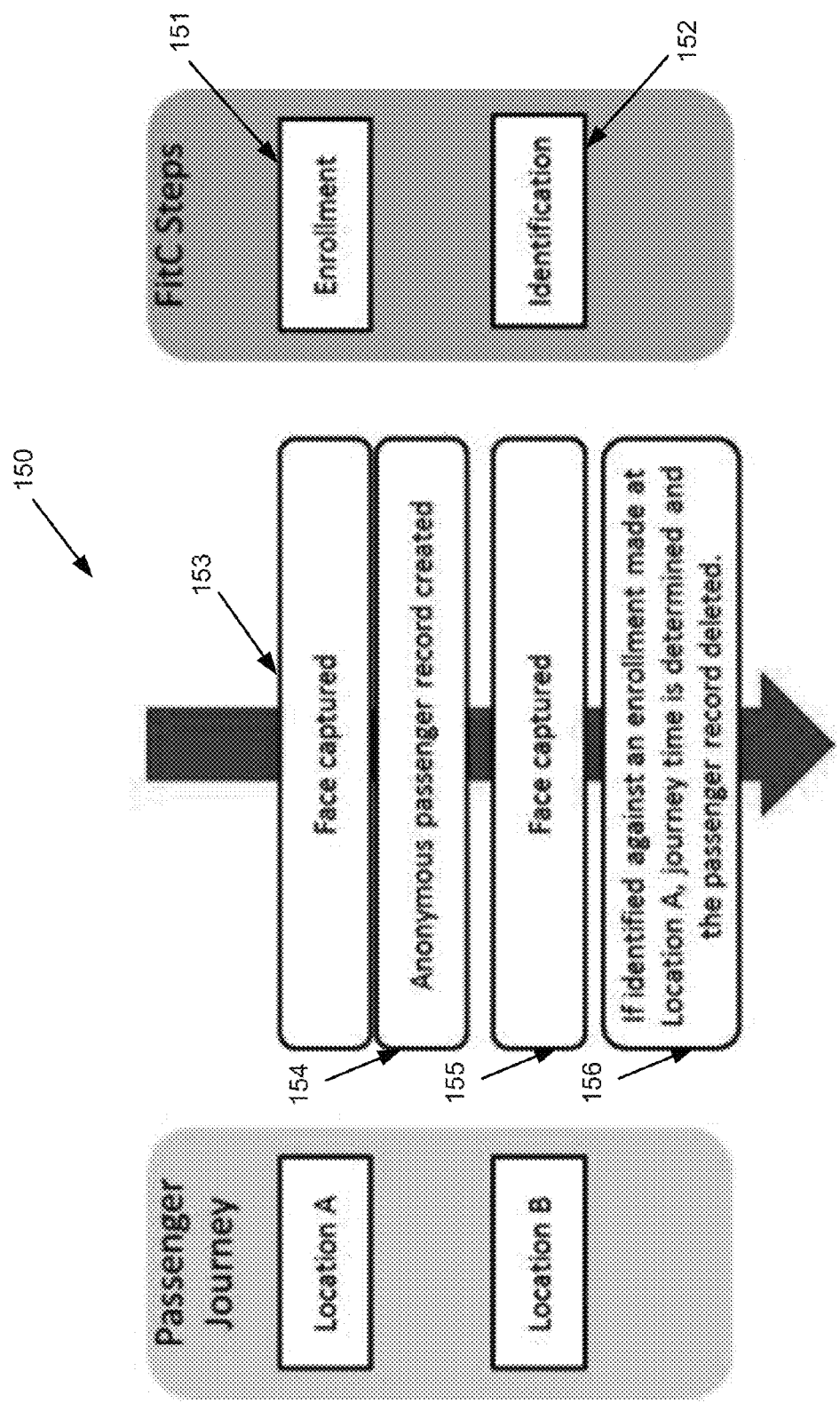
FIG. 6 illustrates a high-level process flow for a passenger timing scenario, according to an example of the present disclosure.
Figure 7:
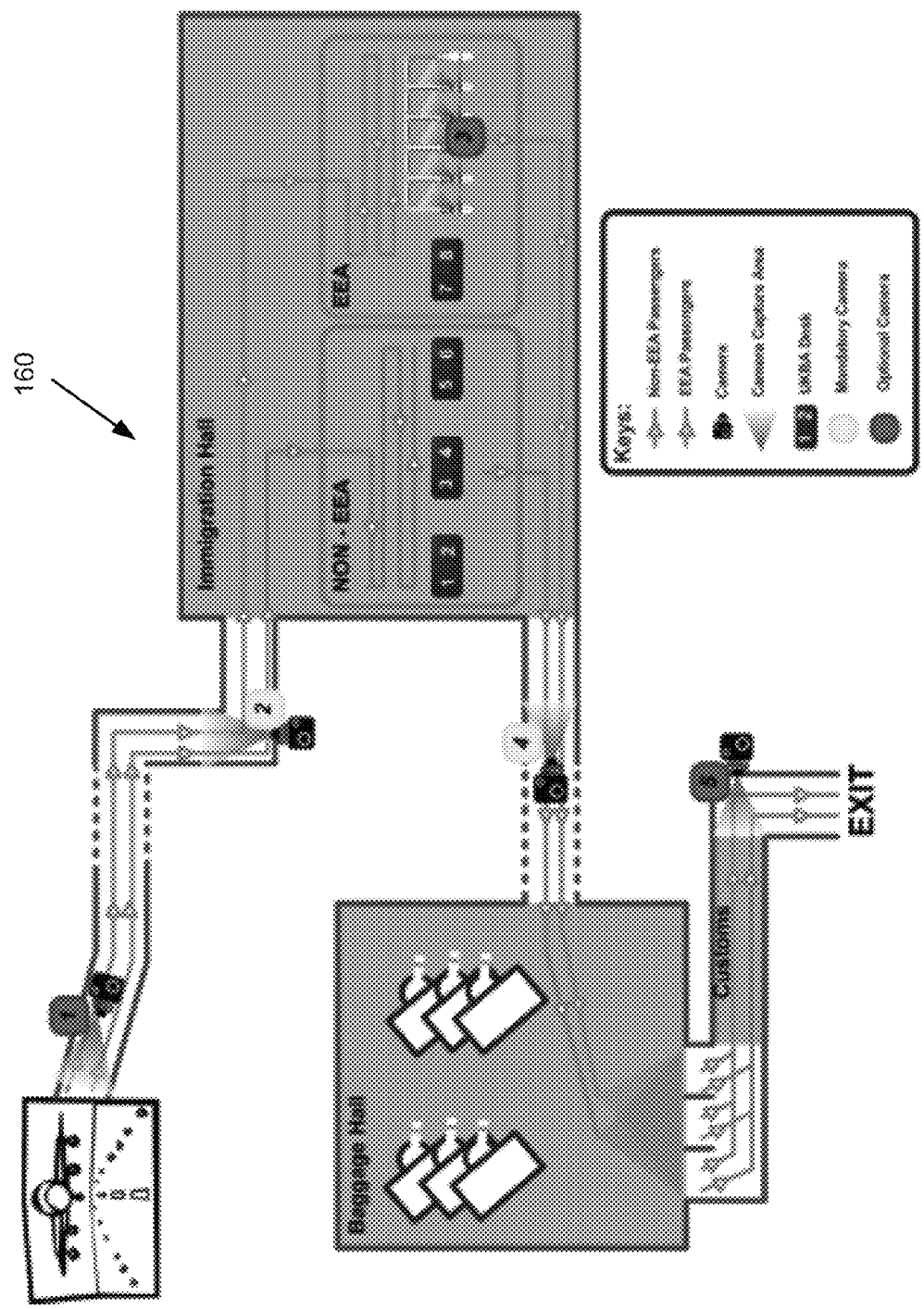
FIG. 7 illustrates a layout for a passenger timing scenario (arrivals), according to an example of the present disclosure.

Referring to FIGS. 6 and 7, for passenger timing, an airport operator's responsibilities include providing passengers and airlines with efficient departure and arrival facilities. The passenger timing scenario aims to establish average travel times between two (or more) points, by identifying people as they pass each location, and time-stamping each appearance against a synchronized time source. Referring to FIG. 6, for passenger timing scenario 150, a passenger's journey may begin at location A and complete at location B. Corresponding to these locations, the system 100 may enroll the passenger at 151 (e.g., via the enrollment UI 114), and identify the passenger at 152 (e.g., via the face identification module 116). At 153, the passenger's face may be captured (e.g., via the image capture device 102), and an anonymous passenger record may be created at 154. At 155, corresponding to location B, the passenger's face may be captured (e.g., via another image capture device 102), and at 156, if identified against an enrollment made at location A, the passenger's journey time may be calculated and the passenger record deleted.

Referring to FIG. 7, a more detailed example 160 of passenger timing is illustrated. At Position 1 at an air bridge, as passengers step outside the aircraft and walk through the jetty, their face may be captured for the first time by the image capture device 102, and stored in the enrolled identities database 115. At Position 2, at the immigration hall entrance, passengers' faces may be captured (e.g., via another image capture device 102) as they enter the immigration hall, giving the dwell time for transit from gate to hall, and providing for the calculation of time to clear immigration. At Position 3, at automated border clearance (ACS) gates, the photos from the ACS gates may be used to monitor the immigration clearance time of passengers using the ACS gates compared to the overall passenger flow, without additional image capture hardware being needed. At Position 4, at the immigration hall exit, passengers' faces may be captured (e.g., via another image capture device 102) as they clear immigration, allowing for the calculation of the dwell time for the immigration process. At Position 5, at the arrivals hall, passengers' faces may be captured (e.g., via another image capture device 102) as they exit the customs area, allowing for the calculation of the baggage retrieval and customs process time, and the total arrivals process time.

For passenger timing, in order for this scenario to be feasible, a meaningful proportion of people's faces should be captured at each timing point, and these may be matched against the enrolled identities database 115 for faces captured at previous points. For example, for passenger timing, the capture rate may be set as ≥70% of people transitioning past a single camera position. The TIR may be set at ≥10%, being the fraction of all passing individuals that are correctly detected and enrolled at Location A (or B), and detected and identified at Location B (or A) (and thus yield accurate timing information). The FIR may be set at ≤2%, being the fraction of all passing individuals that will be incorrectly matched against a different individual (and thus give incorrect timings). In an example, if metrics of TIR=10%, FIR=2% are achieved, a passenger timing deployment of the system 100 would gain correct timing information from one passenger in ten, and that would be counteracted by inaccurate timing information from one passenger in fifty.

Figure 8:
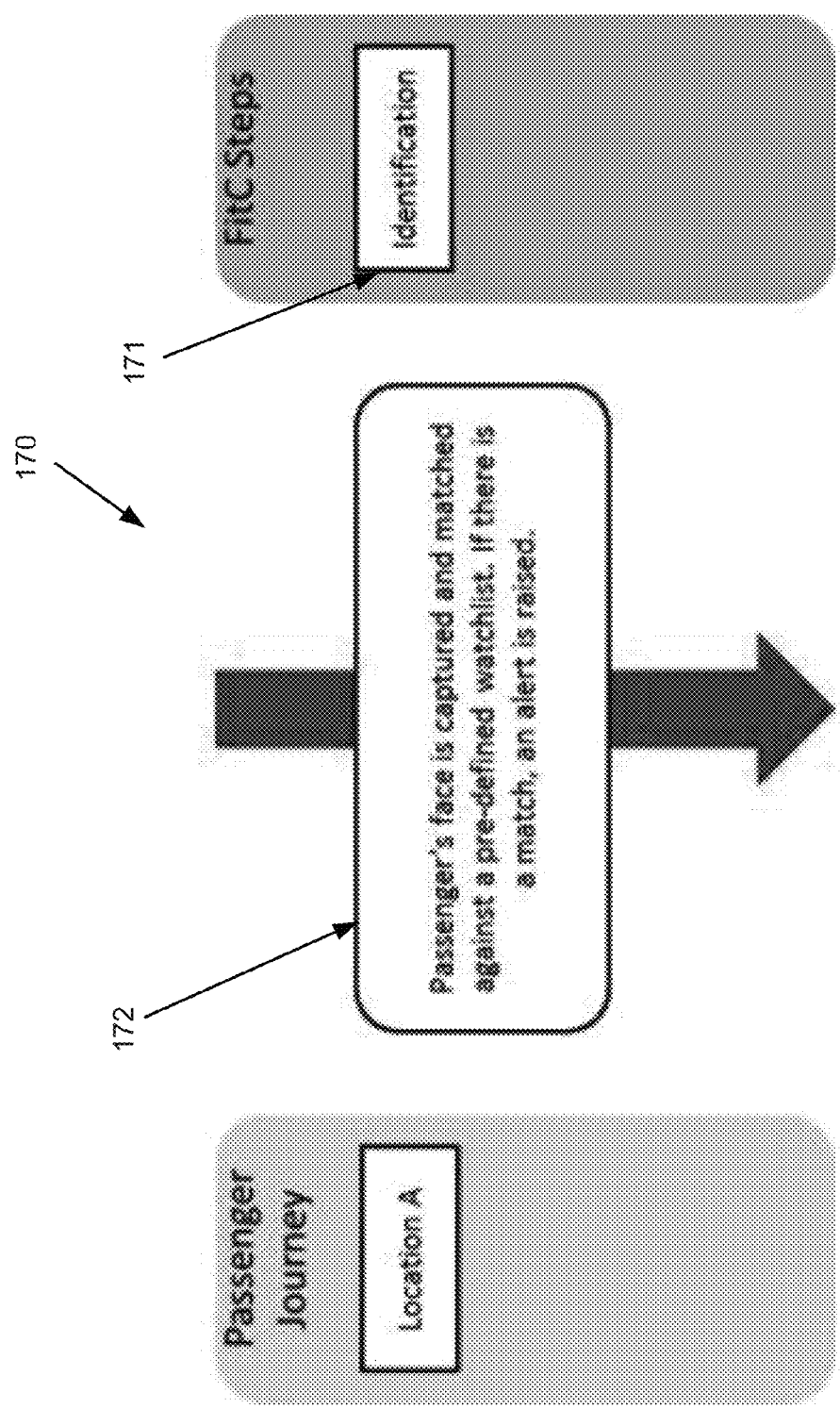
FIG. 8 illustrates a high-level process flow for a face watchlisting scenario, according to an example of the present disclosure.

Referring to FIG. 8, face watchlisting is discussed. Face watchlisting may include a list of wanted individuals maintained, for example, in the enrolled identities database 115. Face watchlisting may include attempts to capture the faces of every passing passenger, and matching them against the enrolled identities database 115. An alert may be raised, for example, by the e-mail notification module 118 and/or the alerting UI 124 for every passing passenger who is on the watchlist, and no alert should be raised for anyone else.

Referring to FIG. 8, for face watchlisting 170, at location A, a passenger may be identified at 171. Once the passenger's face is captured (e.g., by the image capture device 102), at 172, the passenger's face may be matched to a pre-defined watchlist, for example, by the face identification module 116. If a match occurs, an alert may be raised.

In order for face watchlisting to be feasible, a meaningful proportion of individuals' faces should be captured at each location, and these should be correctly matched against a database of wanted faces (e.g., the enrolled identities database 115), with a particular emphasis on a low false match rate so as to avoid false alarms. Alerts should be made available to a central surveillance site (e.g., the monitoring UI 110 and/or the alerting UI 124), for example, for manual adjudication by security officers (side-by-side comparison of the watchlist face and the candidate/passenger face), in order to be usable. In order for the watchlisting results to be useful, the false alert rate should preferably be less than one false alert every five minutes, per terminal. Over a daily period, for example, of 18 hours, that would equate to a total of 864 false alerts requiring manual checking, across all terminals. Based on this example, face watchlisting may use, for example, a capture rate of ≥70% of individuals transitioning past a single image capture device position, a TMR of ≥70%, being the fraction of captured individuals that are on the watchlist and are correctly identified as such, and a FMR of ≤1%, being the fraction of all captured people that are not on the watchlist, but are incorrectly identified as being so. In an example, if metrics of TMR=70%, FMR=1% are achieved, the system 100 would correctly raise an alert for a wanted person approximately one time in two (70%×70%), and would incorrectly raise an alert for an unwanted person less than one time in a hundred (70%×1%).

Figure 9:
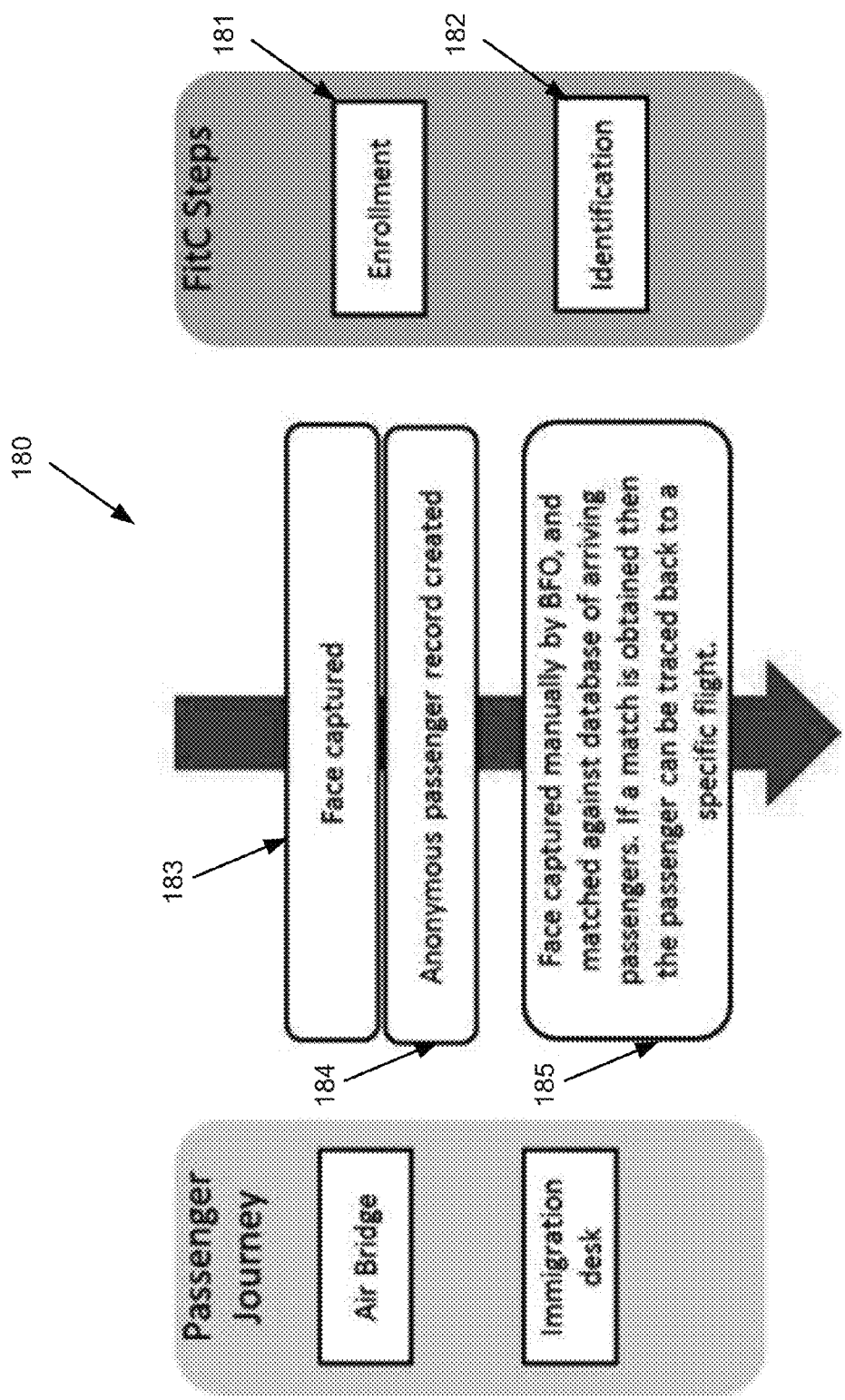
FIG. 9 illustrates a high-level process flow for unknown passenger identification, according to an example of the present disclosure.

Referring to FIG. 9, unknown passenger identification is described. For unknown passenger identification, occasionally, passengers may present at a check-point without any ID documents. These individuals may refuse to provide, or have forgotten information about their own identities. In order for authorities to help identify these individuals, the system 100 may automatically enroll arriving passengers as they exit an aircraft in the enrolled identities database 115, and store that enrolled dataset for a predetermined time period, such as, for example, four hours. In this manner, a rolling database of arriving passengers' faces can be maintained. Hence, an unknown individual at immigration may be photographed there, and the image may be compared to the faces stored in the enrolled identities database 115 by the face identification module 116. Although air bridge enrollment may be performed anonymously, a successful match will inform the immigration officer of which flight the traveler arrived on, assisting their work to identify the individual.

Referring to FIG. 9, for unknown passenger identification at 180, a passenger journey may begin at an air bridge and require identification at an immigration desk. The system 100 may begin enrollment at 181 (e.g., via the enrollment UI 114) and identify the passenger at 182 (e.g., via the face identification module 116). Thus for enrollment at 181, the passenger's face may be captured at 183 (e.g., via the image capture device 102), and an anonymous passenger record created at 184. At 185, the passenger's face may be manually captured (e.g., via the image capture device 102) and matched against a database of arriving passengers (e.g., the enrolled identities database 115). If a match is obtained, the passenger may be traced back to a specific flight for identification.

For unknown passenger identification, a meaningful proportion of individuals' faces should be captured at the air bridge, and high-quality photos (e.g., enrolled at the immigration desk) should match against them with high accuracy. For unknown passenger identification, in an example, the capture rate may be set at ≥70% of individuals transitioning past a single camera position, the TMR may be set at ≥90%, being the fraction of individuals presenting undocumented or unknown that were previously enrolled, and are correctly matched against their enrolled image, and the FMR may be set at ≤1%, being the fraction of individuals presenting undocumented or unknown that were previously enrolled, and are incorrectly matched against someone else's enrolled image. If metrics of TMR=90%, FMR=1% are achieved, an unknown passenger identification deployment of the system 100 would correctly identify the air bridge that an arriving passenger used more than one time in two (70%×90%), and would incorrectly identify the air bridge (or fail to enroll them) approximately one time in three (incorrect matches: 70%×1%; plus failed captures of 30%).

Figure 10:
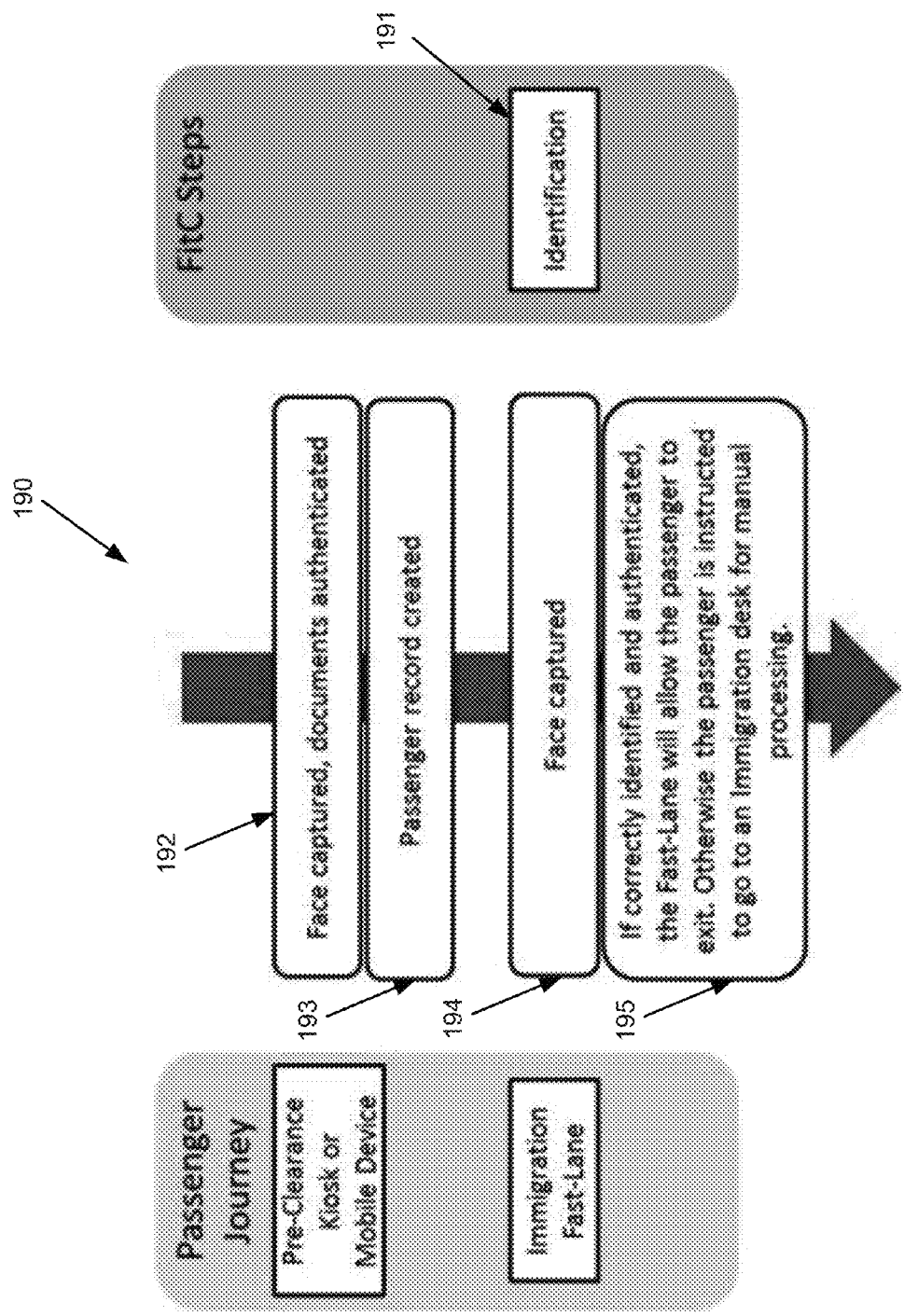
FIG. 10 illustrates a high-level process flow for a border pre-clearance scenario, according to an example of the present disclosure.

Referring to FIG. 10, a high-level process flow for a border pre-clearance scenario 190 is illustrated. For example, by pre-clearing the border using a self-service kiosk in the immigration hall, or somewhere close to the aircraft, or even in the air via a mobile device, face identification may automatically clear the traveler upon arrival without the need to examine the travel documents again. This could be done in an immigration "fast-lane" and the traveler may simply walk through it, and be identified.

As shown in FIG. 10, for border pre-clearance 190, a passenger may be identified at 191, for example, by the face identification module 116. At 192, at a pre-clearance kiosk or via a mobile device, a passenger's face may be captured, for example, via the image capture device 102, and documents authenticated. At 193, a passenger record may be created. At the immigration fast-lane, at 194, a passenger's face may again be captured, for example, via the image capture device 102. At 195, if correctly identified and authenticated, the fast-lane may allow the passenger to exit. Otherwise, the passenger may be instructed to go to an immigration desk for manual processing.

Referring to FIG. 10, for border pre-clearance, a meaningful proportion of individuals' faces should be captured in a fast-lane, and these should be matched against the enrolled identities database 115 of faces. It can be assumed that passengers will want the fast-lane to correctly capture and match their faces. In an example, for border pre-clearance, the capture rate may be set at ≥90% of compliant individuals transitioning past a single camera position, TMR may be set at ≥95%, being the fraction of all captured individuals that are correctly matched against their enrolled record, and FMR may be set at ≤0.5%, being the fraction of all captured individuals that are incorrectly matched against a different enrolled individual (and thus might pass the border without authorization). If metrics of TMR=95%, and FMR=0.5% are achieved, the system 100 may correctly permit nearly 9 in 10 passengers to clear the border by "just walking". Conversely, 1 in 10 would fail to be captured by the cameras and have to visit a manual desk, with 1 in 200 potentially being accepted incorrectly through matching against another individual's profile.

The border pre-clearance scenario 190 of FIG. 10 may be similarly applied to a self-service boarding scenario. For example, similar to the border pre-clearance scenario 190, the self-service boarding scenario may include a self-service kiosk at the boarding gate where face recognition may automatically clear a traveler prior to boarding without the need to examine travel documents. This may be done in a boarding "fast-lane" and the traveler may simply walk through the fast-lane and be identified.

Another example of an application of the system 100 may include a loyalty use scenario, where travelers, such as, for example, frequent flyers or previous customers, may be recognized. In this regard, such customers may be likewise allowed to pass through a fast-lane or otherwise provided appropriate privileges based on their standing with an airline.

The system 100 also provides tracking of individuals from one image capture device 102 to another image capture device 102. For example, for the passenger timing scenario of FIGS. 6 and 7, a passenger of interest may be tracked from one image capture device 102 to another image capture device 102. For an image capture device 102 including the primary camera 130 and the integrated camera system 131, the primary camera 130 and the integrated camera system 131 may also be configured to detect clothing and body shape, and use clothing and body shape to recognize a person and/or achieve tracking from one image capture device 102 to another image capture device 102. Further, the primary camera 130 and/or the integrated camera system 131 may also be configured to recognize gait and other general attributes of people (e.g., birth marks, posture) to recognize a person and/or achieve tracking from one image capture device 102 to another image capture device 102.

The system 100 may also use multiple face recognition algorithms in combination, or selectively, to increase accuracy and performance of matching. For example, the system 100 may selectively use face recognition algorithms based on environmental factors, such as, for example, low resolution images or dim lighting conditions.

For the system 100, the capture rate may be obtained by counting people passing the image capture device 102 and comparing with the number of faces detected and enrolled by the enrollment UI 114. The TMR may be obtained by reviewing the enrolled faces, and comparing each person captured with the enrolled identities database 115 to confirm that they were matched when they should have been, and thus noting a true match. The FMR may be obtained by manually reviewing the matched pairs, and verifying each to confirm that they were only matched when they should have been, otherwise noting a false match. The TIR and FIR may be obtained by reviewing the footage from the image capture device 102, and manually comparing each person passing with the enrolled identities database 115 to confirm that they were matched when they should have been, and thus noting a true identification, and not when they should not have been, otherwise noting a false identification.

Figure 11:
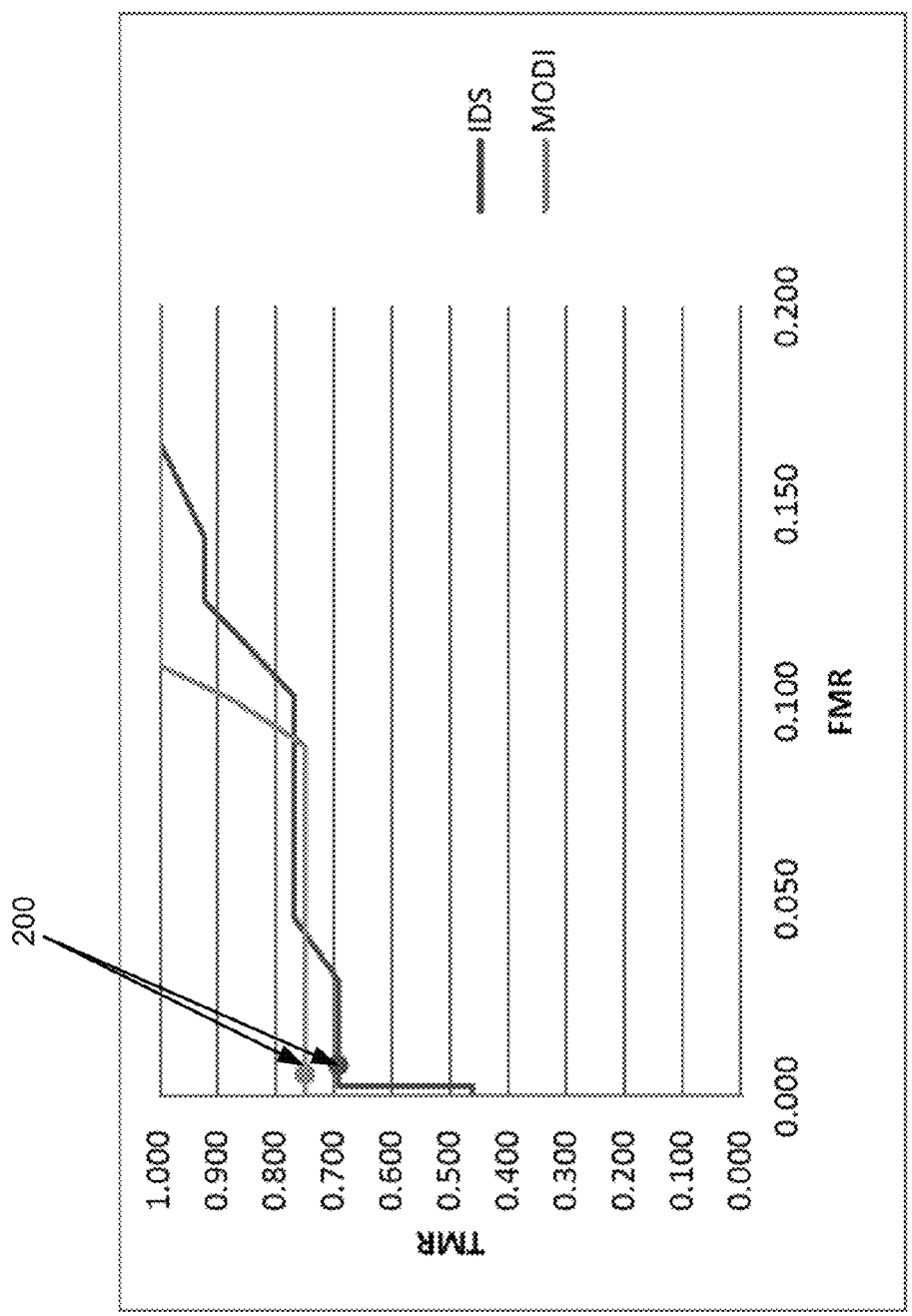
FIG. 11 illustrates a receiver operating characteristic (ROC) curve, according to an example of the present disclosure.

Referring to FIG. 11, a receiver operating characteristic (ROC) curve is illustrated. FIG. 11 provides an overview of the system 100. By plotting the TMR against the FMR, the effect of changing the matching acceptance threshold can be seen. For example, the ROC curve should incline sharply at the beginning, and get as close as possible to the top-left corner. This means that the rate of true matches will be high, and the level of false non-matches will be low, for the same threshold setting at the same time. The "best" threshold setting for a particular application of the system 100 depends on the application. For example, for the face watchlisting scenario, the recommended setting that corresponds to the requirements may be marked at 200 in the graph of FIG. 11.

For operation of the system 100, the incident angle (between the subject's face and the image capture device 102), the focus point, and the zoom of the lens (and hence the field of view) may impact the results. One method of improving results may be to use a zoom whenever possible, and positioning the image capture device 102 and setting the focus such that the footage is taken with the smallest angle possible, relative to the walking path. The angle of the face to the image capture device 102 can impact both the capture and match performances, thus when possible, the image capture device(s) 102 may be positioned to be directly in front of a target's face.

Figure 12:
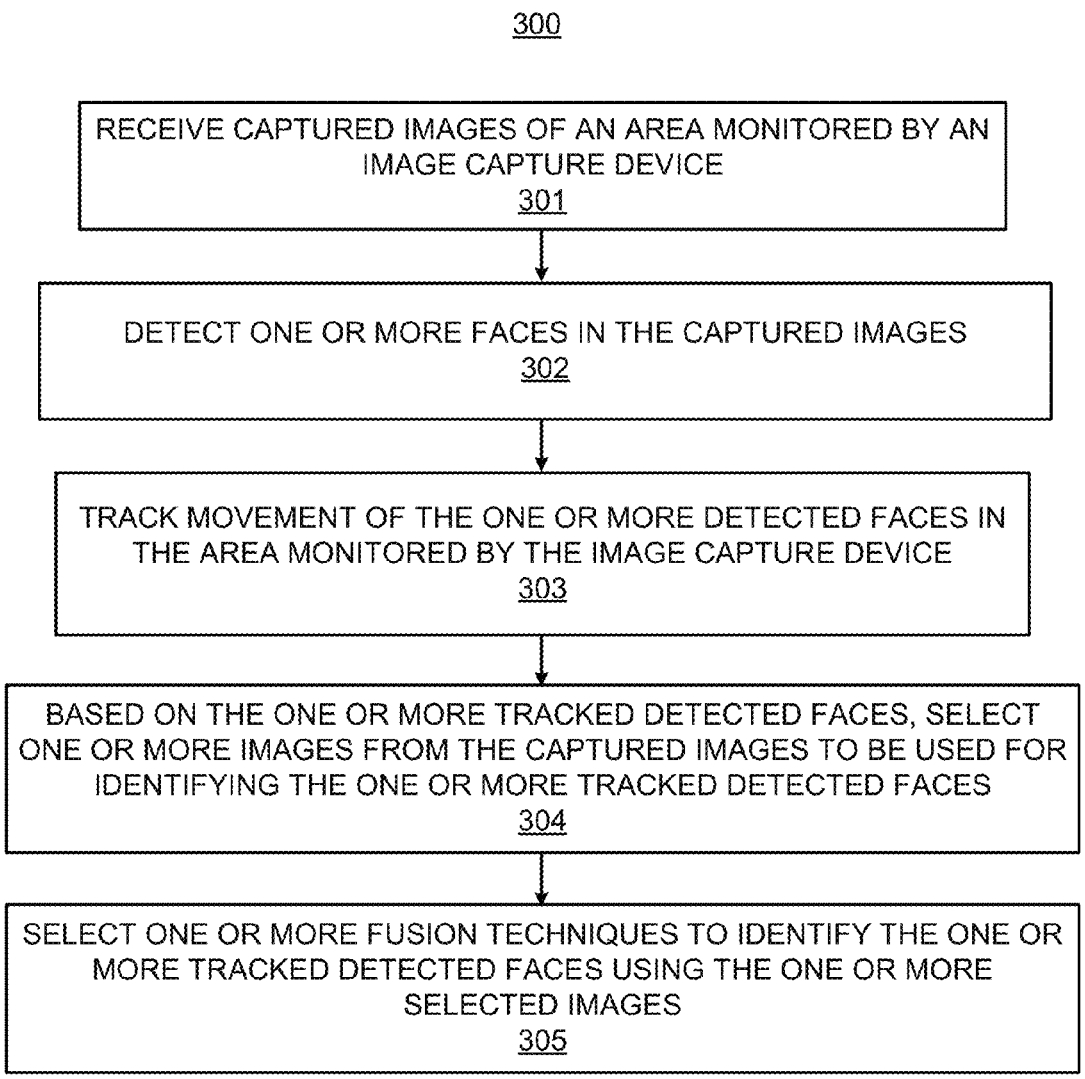
FIG. 12 illustrates a method for face capture and matching, according to an example of the present disclosure.
Figure 13:
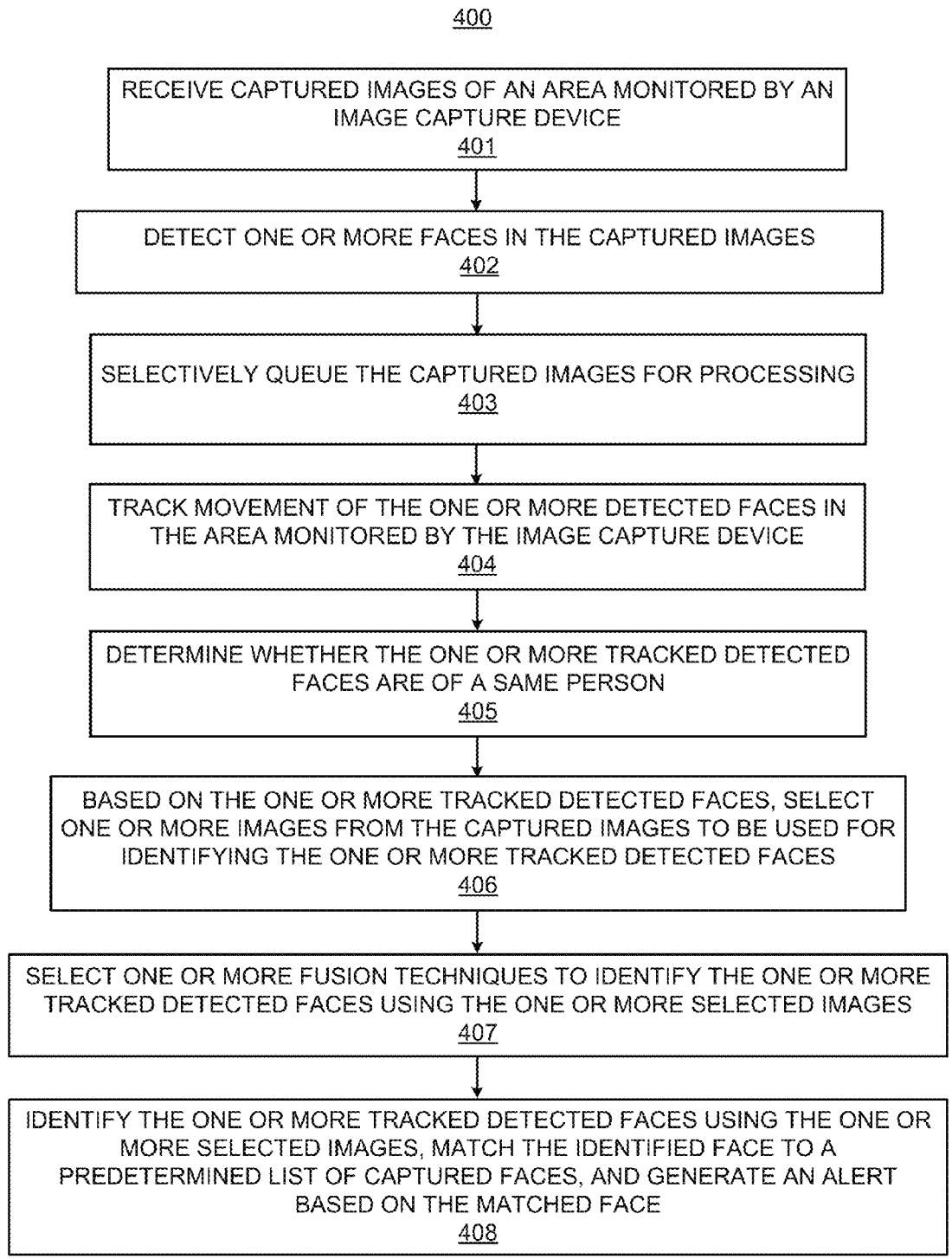
FIG. 13 illustrates further details of the method for face capture and matching, according to an example of the present disclosure.

FIGS. 12 and 13 respectively illustrate flowcharts of methods 300 and 400 for face capture and matching, corresponding to the example of the face capture and matching system 100 whose construction is described in detail above. The methods 300 and 400 may be implemented on the face capture and matching system 100 with reference to FIG. 1 by way of example and not limitation. The methods 300 and 400 may be practiced in other systems.

Referring to FIG. 12, for the method 300, at block 301, captured images of an area monitored by an image capture device may be received. For example, referring to FIG. 1, the image source module 103 may receive captured images of an area monitored by the image capture device 102.

At block 302, one or more faces in the captured images may be detected. For example, referring to FIG. 1, the image source module 103 may detect one or more faces in the captured images.

At block 303, movement of the one or more detected faces may be tracked in the area monitored by the image capture device. For example, referring to FIG. 1, the face tracker module 104 may track movement of the one or more detected faces in the area monitored by the image capture device 102.

At block 304, based on the one or more tracked detected faces, one or more images from the captured images may be selected to be used for identifying the one or more tracked detected faces. For example, referring to FIG. 1, the face tracker module 104 and the fusion module 105 may select one or more images from the captured images to be used for identifying the one or more tracked detected faces, based on the one or more tracked detected faces.

At block 305, one or more fusion techniques may be selected to identify the one or more tracked detected faces using the one or more selected images. For example, referring to FIG. 1, the fusion module 105 may select one or more fusion techniques to identify the one or more tracked detected faces using the one or more selected images. The selection of the images may also be based on the specific fusion technique that is selected. The selection of the fusion techniques thus limits the number of face images sent to the face identification module 116 for matching, while retaining a highest possible quality of the sent face images, and thus the sent faces.

Referring to FIG. 13, for the method 400, at block 401, captured images of an area monitored by an image capture device may be received. For example, referring to FIG. 1, the image source module 103 may receive captured images of an area monitored by the image capture device 102.

At block 402, one or more faces in the captured images may be detected. For example, referring to FIG. 1, the image source module 103 may detect one or more faces in the captured images.

At block 403, the captured images may be selectively queued for processing. For example, the captured images may be selectively queued to process the captured images that include a predetermined number of the one or more detected faces for movement tracking. Alternatively or additionally, the captured images may be selectively queued to process the captured images that include a predetermined number of the one or more detected faces that meet a predetermined quality metric for movement tracking. Alternatively or additionally, the captured images may be selectively queued to process the captured images for movement tracking based on a predetermined time lag and/or a maximum number of images queued. The selective queuing of the images may provide benefits, such as, for example, offload of processing peaks (e.g., at times with many faces) to periods with additional available resources (e.g., at times with less faces).

At block 404, movement of the one or more detected faces may be tracked in the area monitored by the image capture device. For example, referring to FIG. 1, the face tracker module 104 may track movement of the one or more detected faces in the area monitored by the image capture device 102.

At block 405, a determination may be made whether the one or more tracked detected faces are of a same person if the one or more tracked detected faces are located within a predetermined distance in consecutive captured images. The predetermined distance may be based, for example, on an image capture rate of the image capture device 102. Alternatively or additionally, a determination may be made whether the one or more tracked detected faces are of a same person if the one or more tracked detected faces are located along a calculated direction of movement in consecutive captured images. Alternatively or additionally, a determination may be made whether the one or more tracked detected faces are of a same person based on a size of the one or more tracked detected faces in consecutive captured images.

At block 406, based on the one or more tracked detected face, one or more images from the captured images may be selected to be used for identifying the one or more tracked detected faces. For example, referring to FIG. 1, the face tracker module 104 and the fusion module 105 may select one or more images from the captured images to be used for identifying the one or more tracked detected faces, based on the one or more tracked detected faces.

At block 407, one or more fusion techniques may be selected to identify the one or more tracked detected faces using the one or more selected images. For example, referring to FIG. 1, the fusion module 105 may select one or more fusion techniques based on a number of detected faces per tracked detected face, quality of the detected faces in the captured images, and/or availability of processing resources. For example, the fusion module 105 may use the single best face image fusion technique based on detection of a frontal face of a predetermined quality to identify the one or more tracked detected faces. Alternatively or additionally, the fusion module 105 may use the matching template fusion technique based on a combination of a plurality of frontal faces to generate a fused matching template to identify the one or more tracked detected faces. Alternatively or additionally, the fusion module 105 may use the 3D model fusion technique based on generation of a 3D model of a face from a plurality of detected faces to identify the one or more tracked detected faces.

At block 408, the one or more tracked detected faces may be identified using the one or more selected images, the identified face(s) may be matched to a predetermined list of captured faces, and an alert may be generated based on the matched face(s). For example, referring to FIG. 1, the face identification module 116 may identify the one or more tracked detected faces using the one or more selected images. The face identification module 116 may further match the identified face(s) to a predetermined list of captured faces. Further, the e-mail notification module 118 and/or the monitoring and history module 125 may generate an alert based on the matched face via the alerting UI 124. The alert may be an e-mail to alert a user of the face capture and matching system 100 of the matched face (e.g., via the e-mail notification module 118), and/or a color coded signal and/or an audio signal to alert a user of the face capture and matching system 100 of the matched face (e.g., via the alerting UI 124).

Figure 14:
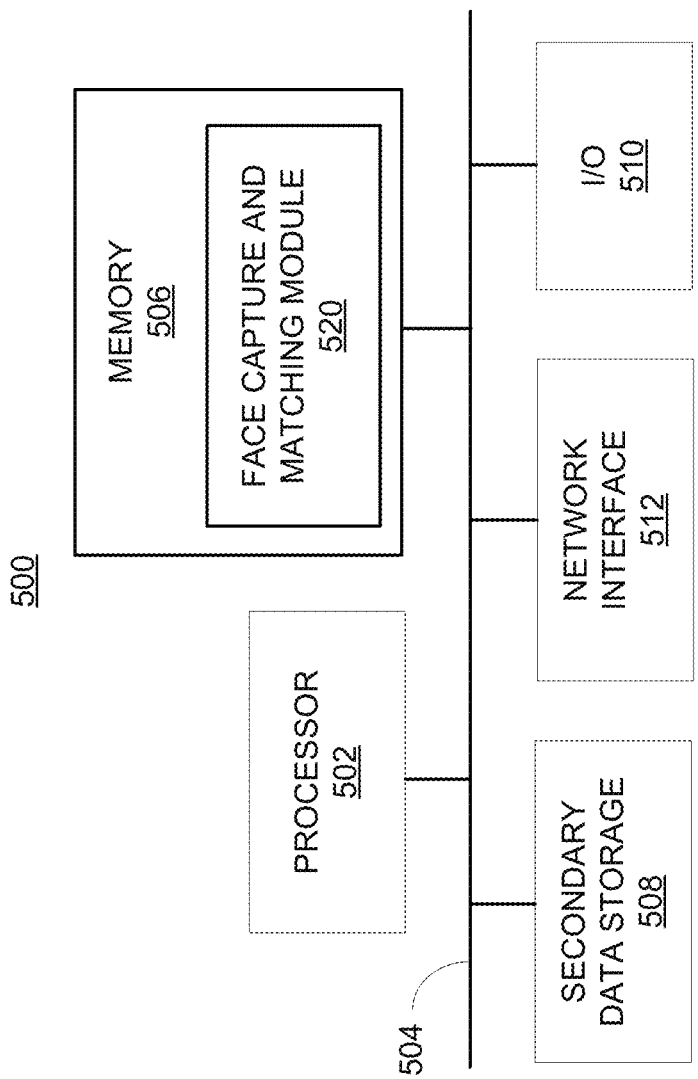
FIG. 14 illustrates a computer system, according to an example of the present disclosure.

FIG. 14 shows a computer system 500 that may be used with the embodiments described herein. The computer system 500 may represent a generic platform that may include components that may be in a server or another computer system. The computer system 500 may be used as a platform for the system 100. The computer system 500 may execute, by a processor or other hardware processing circuit, the methods, functions and other processes described herein. These methods, functions and other processes may be embodied as machine readable instructions stored on computer readable medium, which may be non-transitory, such as, for example, hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions and other processes described herein. Commands and data from the processor 502 may be communicated over a communication bus 504. The computer system 500 may also include a main memory 506, such as, for example, a random access memory (RAM), where the machine readable instructions and data for the processor 502 may reside during runtime, and a secondary data storage 508, which may be non-volatile and stores machine readable instructions and data. The memory and data storage may be examples of computer readable mediums. The memory 506 may include a face capture and matching module 520 including machine readable instructions residing in the memory 506 during runtime and executed by the processor 502. The face capture and matching module 520 may include the modules of the face capture and matching system 100 shown in FIG. 1.

The computer system 500 may include an I/O device 510, such as, for example, a keyboard, a mouse, a display, etc. The computer system 500 may include a network interface 512 for connecting to a network. Other known electronic components may be added or substituted in the computer system 500.

While the embodiments have been described with reference to examples, various modifications to the described embodiments may be made without departing from the scope of the claimed embodiments.

What is claimed is:

1. A face capture and matching system comprising:
   a non-transitory machine readable storage medium storing machine readable instructions to:
   receive captured images of an area monitored by an image capture device;
   detect at least one face in the captured images;
   track movement of the at least one detected face in the area monitored by the image capture device;
   based on the at least one tracked detected face, select at least one image from the captured images to be used for identifying the at least one tracked detected face; and
   select at least one fusion technique to identify the at least one tracked detected face using the at least one selected image;
   selectively queue selected ones of the captured images to process the selected ones of the captured images based on a determination of whether a predetermined number of the at least one detected face for movement tracking exceeds a specified threshold; and
   a processor to implement the machine readable instructions.

2. The face capture and matching system of claim 1, further comprising machine readable instructions to:
   provide feedback to the image capture device to enhance image characteristics.

3. The face capture and matching system of claim 1, wherein the machine readable instructions to track the movement of the at least one detected face in the area monitored by the image capture device further comprise machine readable instructions to:
   assign a tracking identification (ID) to the at least one tracked detected face.

4. The face capture and matching system of claim 1, wherein the machine readable instructions to track the movement of the at least one detected face in the area monitored by the image capture device further comprise machine readable instructions to:
   determine that the at least one tracked detected face is of a same person if the at least one tracked detected face is located within a predetermined distance in consecutive captured images.

5. The face capture and matching system of claim 4, further comprising machine readable instructions to:
   increase or decrease the predetermined distance based on an image capture rate of the image capture device.

6. The face capture and matching system of claim 1, wherein the machine readable instructions to track the movement of the at least one detected face in the area monitored by the image capture device further comprise machine readable instructions to:
   determine that the at least one tracked detected face is of a same person if the at least one tracked detected face is located along a calculated direction of movement in consecutive captured images.

7. The face capture and matching system of claim 1, wherein the machine readable instructions to track the movement of the at least one detected face in the area monitored by the image capture device further comprise machine readable instructions to:
   determine that the at least one tracked detected face is of a same person based on a size of the at least one tracked detected face in consecutive captured images.

8. The face capture and matching system of claim 1, wherein the machine readable instructions to select the at least one fusion technique to identify the at least one tracked detected face using the at least one selected image further comprise machine readable instructions to:
   use a single best face image fusion technique based on detection of a frontal face of a predetermined quality related to a quality of the at least one detected face in the captured images to identify the at least one tracked detected face.

9. The face capture and matching system of claim 1, wherein the machine readable instructions to select the at least one fusion technique to identify the at least one tracked detected face using the at least one selected image further comprise machine readable instructions to:
   use a matching template fusion technique based on a combination of a plurality of frontal faces to generate a fused matching template to identify the at least one tracked detected face.

10. The face capture and matching system of claim 1, wherein the machine readable instructions to select the at least one fusion technique to identify the at least one tracked detected face using the at least one selected image further comprise machine readable instructions to:
    use a three-dimensional (3D) model fusion technique based on generation of a 3D model of a face from a plurality of detected faces to identify the at least one tracked detected face.

11. The face capture and matching system of claim 1, wherein the machine readable instructions to select the at least one fusion technique to identify the at least one tracked detected face using the at least one selected image further comprise machine readable instructions to:
    select the at least one fusion technique from a plurality of fusion techniques including:
    a single best face image fusion technique based on detection of a frontal face of a predetermined quality to identify the at least one tracked detected face,
    a matching template fusion technique based on a combination of a plurality of frontal faces to generate a fused matching template to identify the at least one tracked detected face, and
    a three-dimensional (3D) model fusion technique based on generation of a 3D model of a face from a plurality of detected faces to identify the at least one tracked detected face.

12. The face capture and matching system of claim 1, further comprising machine readable instructions to:

identify the at least one tracked detected face using the at least one selected image;
match the identified face to a predetermined list of captured faces; and
generate an alert based on the matched face.

13. The face capture and matching system of claim 12, wherein the machine readable instructions to generate the alert based on the matched face further comprise machine readable instructions to:
generate an e-mail to alert a user of the face capture and matching system of the matched face.

14. The face capture and matching system of claim 12, wherein the machine readable instructions to generate the alert based on the matched face further comprise machine readable instructions to:
generate at least one of a color coded signal and an audio signal to alert a user of the face capture and matching system of the matched face.

15. A method for face capture and matching, the method comprising:
receiving captured images of an area monitored by an image capture device;
detecting at least one face in the captured images;
tracking movement of the at least one detected face in the area monitored by the image capture device by
determining that the at least one tracked detected face is of a same person if the at least one tracked detected face is located within a predetermined distance in consecutive captured images, and increase or decrease the predetermined distance based on an image capture rate of the image capture device,
determining that the at least one tracked detected face is of the same person if the at least one tracked detected face is located along a calculated direction of movement in the consecutive captured images, or
determining that the at least one tracked detected face is of the same person based on a size of the at least one tracked detected face in the consecutive captured images;
based on the at least one tracked detected face, selecting at least one image from the captured images to be used for identifying the at least one tracked detected face; and
selecting, by a processor, at least one fusion technique to identify the at least one tracked detected face using the at least one selected image.

16. The method according to claim 15, further comprising:
selectively queuing selected ones of the captured images to process the selected ones of the captured images based on a determination of a predetermined number of the at least one detected face for movement tracking.

17. The method according to claim 15, further comprising:
selectively queuing the captured images to process the captured images that include a predetermined number of the at least one detected face that meet a predetermined quality metric related to a quality of the at least one detected face in the captured images for movement tracking.

18. The method according to claim 15, further comprising:
selectively queuing the captured images to process the captured images for movement tracking based on at least one of a predetermined time lag and a maximum number of images queued.

19. A non-transitory computer readable medium having stored thereon a computer executable program to provide face capture and matching, the computer executable program when executed causes a computer system to:
receive captured images of an area monitored by an image capture device;
detect at least one face in the captured images;
track movement of the at least one detected face in the area monitored by the image capture device;
based on the at least one tracked detected face, select at least one image from the captured images to be used for identifying the at least one tracked detected face; and
select, by a processor, at least one fusion technique to identify the at least one tracked detected face using the at least one selected image by using a matching template fusion technique based on a combination of a plurality of frontal faces to generate a fused matching template to identify the at least one tracked detected face.

20. The non-transitory computer readable medium according to claim 19, the computer executable program when executed further causes the computer system to:
selectively queue selected ones of the captured images to process the selected ones of the captured images based on a determination of whether a predetermined number of the at least one detected face for movement tracking exceeds a specified threshold,
selectively queue the captured images to process the captured images that include the predetermined number of the at least one detected face that meet a predetermined quality metric related to the quality of the at least one detected face in the captured images for movement tracking, or
selectively queue the captured images to process the captured images for movement tracking based on at least one of a predetermined time lag and a maximum number of images queued.

* * * * *